(12) United States Patent
Kim (10) Patent No.: US 8,709,566 B2
(45) Date of Patent: Apr. 29, 2014

(54) LAMINATION SHEET

(75) Inventor: Hoon Kim, Yongin (KR)

(73) Assignee: Samsung Display Co., Ltd., Giheung-Gu, Yongin, Gyeonggi-Do (KR)

( * ) Notice: Subject to any disclaimer, the term of this patent is extended or adjusted under 35 U.S.C. 154(b) by 220 days.

(21) Appl. No.: 13/032,260

(22) Filed: Feb. 22, 2011

(65) Prior Publication Data

US 2011/0206887 A1 Aug. 25, 2011

(30) Foreign Application Priority Data

Feb. 24, 2010 (KR) .................. 10-2010-0016770

(51) Int. Cl.
*B32B 7/12* (2006.01)
*B32B 3/14* (2006.01)
*B32B 3/16* (2006.01)
*B32B 3/10* (2006.01)

(52) U.S. Cl.
USPC .......... 428/40.1; 428/41.7; 428/41.8; 428/54; 428/55; 428/131; 428/134; 428/136

(58) Field of Classification Search
USPC ........ 428/40.1, 41.8, 41.7, 42.2, 42.3, 54, 55, 428/99, 131, 134, 136
See application file for complete search history.

(56) References Cited

U.S. PATENT DOCUMENTS

| | | | |
|---|---|---|---|
| 5,268,049 A | 12/1993 | Marriott et al. | |
| 6,042,675 A | 3/2000 | Kim | |
| 6,277,456 B1 * | 8/2001 | Bulgrin et al. | 428/40.1 |
| 6,902,454 B1 | 6/2005 | Petruchik | |
| 7,153,556 B2 * | 12/2006 | McKillip | 428/40.1 |
| 2008/0278671 A1 | 11/2008 | Suzuki | |
| 2009/0108264 A1 | 4/2009 | Inoue et al. | |

FOREIGN PATENT DOCUMENTS

| | | |
|---|---|---|
| JP | 59117648 | 8/1984 |
| JP | 2009126912 | 6/2009 |
| KR | 10-0570641 | 5/2005 |
| KR | 1020060020034 A | 3/2006 |
| KR | 1020060020051 A | 3/2006 |
| KR | 100725289 B | 5/2007 |
| KR | 1020080020086 A | 3/2008 |
| KR | 1020080050616 A | 6/2008 |
| KR | 1020080081065 A | 9/2008 |

OTHER PUBLICATIONS

Machine translation of JP 2009-126912 A, Feb. 7, 2013.*

* cited by examiner

*Primary Examiner* — Patricia L Nordmeyer
(74) *Attorney, Agent, or Firm* — Robert E. Bushnell, Esq.

(57) ABSTRACT

A lamination sheet includes a base film; a laminated material layer applied on the base film; and a cover film disposed on the laminated material layer, wherein the laminated material layer is interposed between the base film and the cover film and one edge of the base film comprising a base film removing tab extending beyond one edge of the laminated material layer and the base film removing tab not overlapping the laminated material layer; one edge of the cover film comprising a cover film removing tab extending beyond one edge of the laminated material layer and the cover film removing tab not overlapping the laminated material layer; and at least a part of the base film removing tab is formed not to overlap the cover film removing tab. A method for manufacturing a lamination sheet is also provided.

8 Claims, 8 Drawing Sheets

LAMINATION SHEET

CLAIM OF PRIORITY

This application makes reference to, incorporates the same herein, and claims all benefits accruing under 35 U.S.C. §119 from an application for LAMINATION SHEET AND METHOD FOR MANUFACTURING THE SAME earlier filed in the Korean Intellectual Property Office on 24 Feb. 2010 and there duly assigned Ser. No. 10-2010-0016770.

BACKGROUND OF THE INVENTION

1. Field of the Invention

The following description relates generally to a lamination sheet and a method for manufacturing the same, and more particularly, to a lamination sheet having a structure capable of attaching a plurality of laminated sheets to a substrate at a predetermined interval and a method for manufacturing the lamination sheet.

2. Description of the Related Art

Recently, many cutting methods capable of simultaneously increasing production and production efficiency have been used at the time of manufacturing a display panel. Those cutting methods are methods that cut one sheet of a glass plate into several sheets of display panels to manufacture a plurality of display panels.

In the above cutting methods, a case where a plurality of lamination sheets are laminated on a glass plate may occur.

For example, in order to manufacture a semiconductor device having complex characteristics on a glass substrate, a photo resist may be attached on the glass substrate in a lamination sheet formed by using a photo lithography method.

For example, in order to manufacture a large AMOLED panel, when forming a laminating structure having no cavity between upper and lower substrates, a laminating may be performed by using a lamination sheet.

As described above, a lamination sheet is generally used by continuously performing coating dry on a base film for the lamination sheet and then cutting the base film.

However, when utilizing the above mentioned cutting methods, a plurality of lamination sheets are not simultaneously attached to the substrate. The above mentioned cutting methods attach each sheet individually to a substrate, therefore, the process production speed is slow.

The above information described in this background section is only to enhance the comprehension of the principles of the present invention and therefore it may contain information that does not form prior art that is already known to a person of ordinary skill in the art.

SUMMARY OF THE INVENTION

The following described technology is made in an effort to provide a lamination sheet configured to attach a plurality of laminated sheets to a substrate by a simplified process.

Further, the present invention is made in an effort to provide a method for manufacturing a lamination sheet to which a number of cutting methods may be simply applied.

An exemplary embodiment provides a lamination sheet, including: a base film; a laminated material layer disposed upon the base film; and a cover film disposed upon the laminated material layer with the laminated material layer interposed between the base film and the cover film, and one edge of the base film comprising a base film removing tab extending one edge of the laminated material layer and the base film removing tab not overlapping the laminated material layer, one edge of the cover film comprising a cover film removing tab extending one edge of the laminated material layer and the cover film removing tab not overlapping with the laminated material layer, and at least a part of the base film removing tab is formed not to overlap the cover film removing tab.

The laminated material layer may include a plurality of laminated material unit sheets having a predetermined size and the laminated material unit sheets may be disposed on the base film to be spaced from each other.

The laminated material unit sheet may have a rectangular shape.

The plurality of the laminated material unit sheets may be formed in three.

The plurality of the laminated material unit sheets may be arranged in parallel with each other in a longitudinal direction.

A hole region from where the base film and the cover film are removed is formed between the adjacent laminated material unit sheets on the lamination sheet.

The base film and the cover film may be formed to be more extended in both sides than the laminated material layer.

At least one edge portion of both edge portions of the base film is more extended in a traverse direction than the cover film.

The width of the laminated material unit sheet may correspond to the width of the substrate to which the laminated material unit sheet is bonded.

All of the widths of pluralities of laminated material unit sheets may be the same.

All of the widths between pluralities of laminated material unit sheets may be the same.

Another embodiment provides a method for manufacturing a lamination sheet, including: providing a base film; applying a laminated material layer having a predetermined size upon the base film in a longitudinal direction of the base film; positioning a cover film upon the laminated material layer; forming a plurality of laminated material unit sheets having a predetermined size by removing predetermined regions of the base film, a laminated material layer, and a cover film.

The removal of the predetermined regions of the base film, the laminated material layer and the cover film may be made by a punching.

The laminated material layer may be interposed between the base film and the cover film. One edge of the base film comprising a base film removing tab extending beyond one edge of the laminated material layer and the base film removing tab not overlapping the laminated material layer, one edge of the cover film comprising a cover film removing tab extending beyond one edge of the laminated material layer and the cover film removing tab not overlapping the laminated material layer, and at least a part of the base film removing tab may be formed not to overlap the cover film removing tab.

According to an embodiment, a lamination sheet may be manufactured by a simple method that forms a laminated material layer between a base film and a cover film and then the lamination sheet may be formed by a punching process.

According to an embodiment, a base film and a cover film may be easily removed from a laminated material layer by forming a base film removing part on the base film and a cover film removing part on the cover film not to overlap with the laminated material layer.

DETAILED DESCRIPTION OF THE INVENTION

The general inventive concept is described more fully below with reference to the accompanying drawings, in which exemplary embodiments of the present invention are shown. As those skilled in the art would realize, the described embodiments may be modified in various different ways, all without departing from the spirit or scope of the present invention. The present invention should not be construed as being limited to the embodiments. Accordingly, the drawings and description are to be regarded as illustrative in nature to explain aspects of the present invention and not restrictive. Like reference numerals in the drawings designate like elements throughout the specification, and thus their description have not been repeated.

Figure 1:
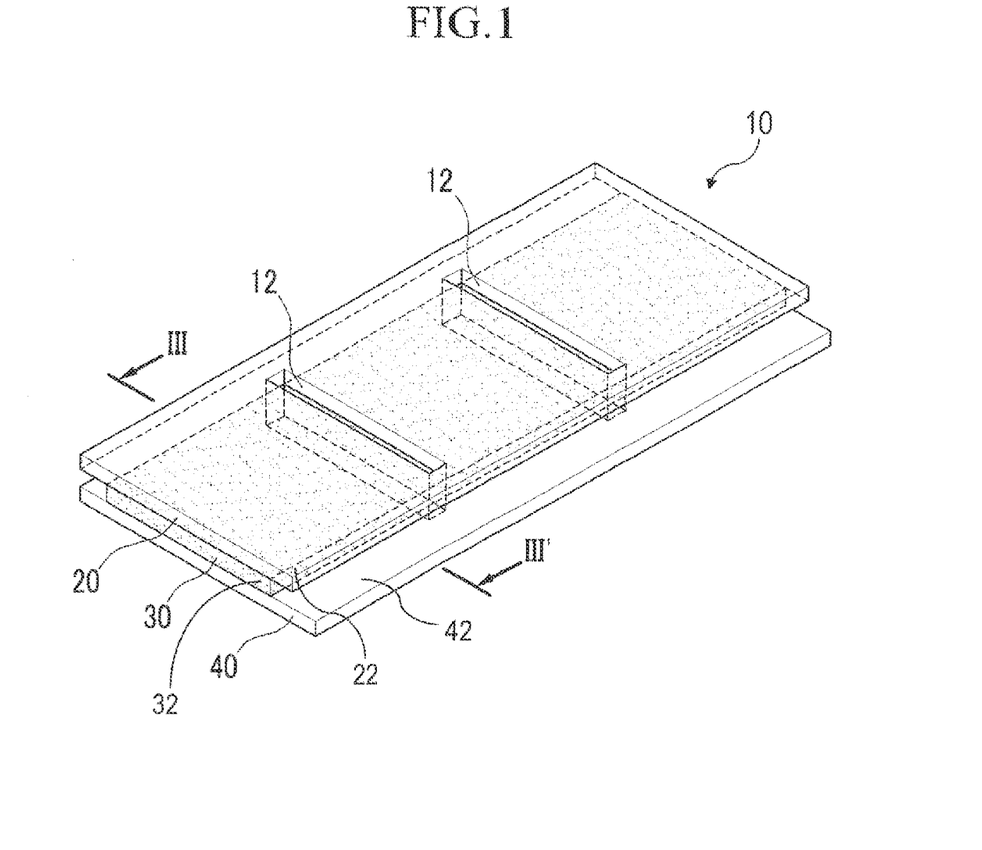
FIG. 1 is a perspective view of a lamination sheet constructed as an exemplary embodiment of present invention.
Figure 2:
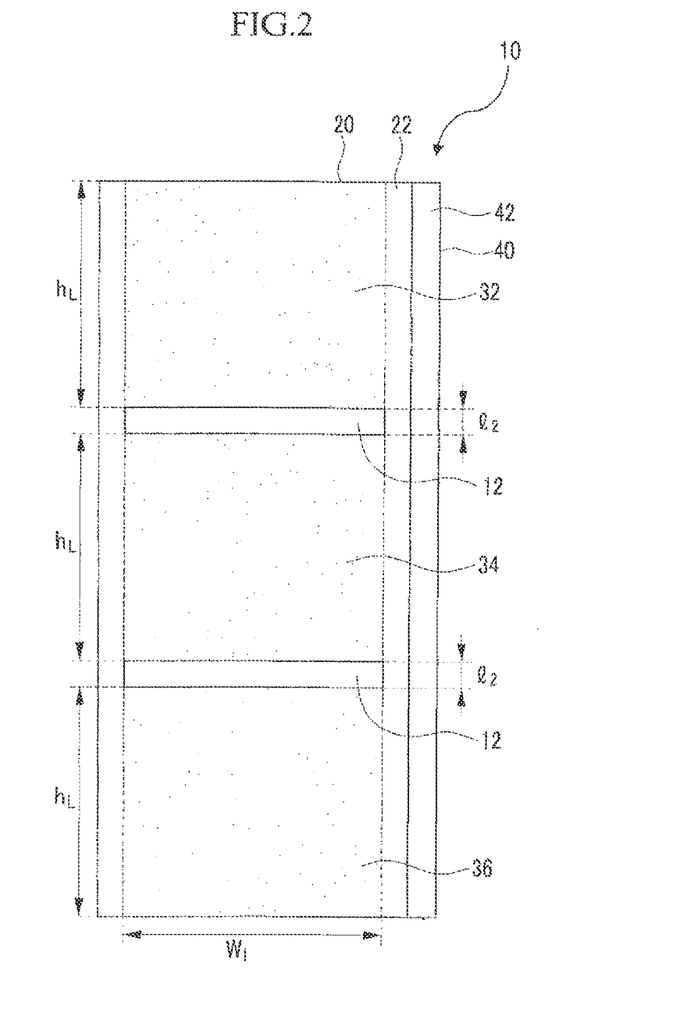
FIG. 2 is a plan view of the lamination sheet of FIG. 1.
Figure 3:
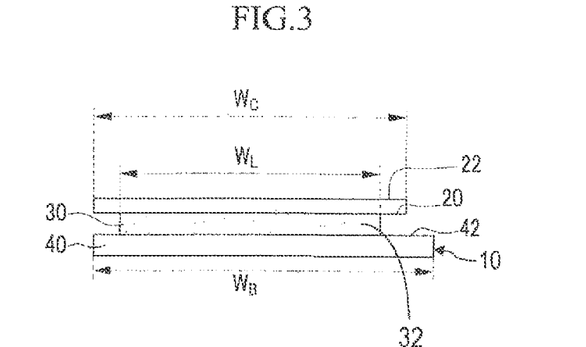
FIG. 3 is a cross-sectional view taken along line III-III' of FIG. 1.
Figure 4:
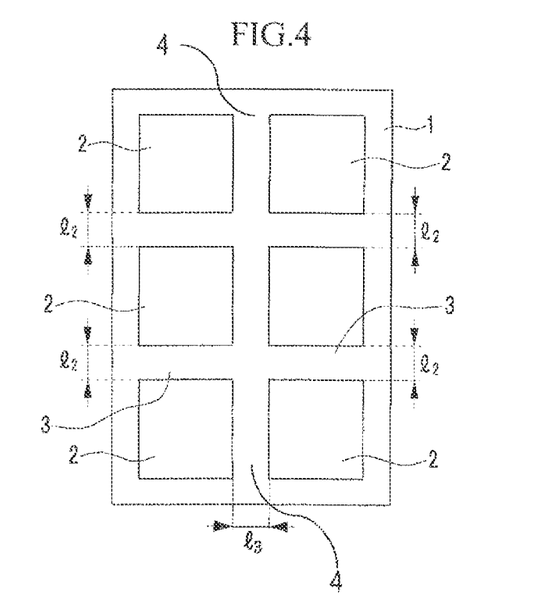
FIG. 4 is a plan view of a substrate to which laminated material unit sheets of a lamination sheet constructed as an exemplary embodiment is attached.

FIG. 1 is a perspective view of a lamination sheet constructed as an exemplary embodiment of present invention. FIG. 2 is a plan view of the lamination sheet of FIG. 1. FIG. 3 is a cross-sectional view of a lamination sheet taken along line III-III' of FIG. 1. FIG. 4 is a plan view of a substrate to which laminated material unit sheets of a lamination sheet is attached constructed as an exemplary embodiment.

As shown in FIG. 1 through FIG. 3, a lamination sheet 10 according to an exemplary embodiment includes a base film 40, a laminated material layer 30, and a cover film 20.

The base film 40 is a sheet on which the laminated material layer 30 is applied and the base film 40 is formed to have a wider width than the laminated material layer 30. The base film 40 is a protective film that protects one surface, i.e., the lower surface of the laminated material layer 30.

One edge of the base film 40 is formed with a base film removing tab 42. The base film removing tab 42 does not overlap the laminated material layer 30.

Referring to FIG. 4, a substrate 1 includes a plurality of laminated regions 2, regions 3 and region 4. The laminated region 2 has a rectangular shape. The region 3 has a width $l_2$ and is formed between the laminated regions 2 along a wide direction of the substrate 1. The region 4 has a width $l_3$ and is formed between the laminated regions 2 along a linear direction of the substrate 1.

The plurality of the laminated regions 2, for example, formed as display panels, are arranged in parallel with each other in a transverse direction and a longitudinal direction on the substrate 1. The laminated material layers 30 are laminated on a plurality of laminated regions 2 of the substrate 1. In the present exemplary embodiment, three laminated regions 2 are arranged in a longitudinal direction and two columns in a transverse direction on the substrate 1.

The base film 40 is formed to be removed from the lamination sheet 10 before the lamination sheet 10 is laminated on a target, substrate 1. For example, the laminated material layer 30 after removing the base film 40 is laminated on the substrate 1.

According to the present exemplary embodiment, one side of the base film 40 is formed with the base film removing tab 42. The base film 40 may be easily removed from the laminated material layer 30 by the base film removing tab 42.

The laminated material layer 30 is a layer that is laminated on a target to be laminated, for example, the substrate 1. The laminated material layer 30 may be made of various materials according to the materials to be laminated.

In the present exemplary embodiment, the laminated material layer 30 laminated on the substrate 1 may be a laminating material layer made of a laminating material formed on a substrate for an organic light emitting diode device.

According to the present exemplary embodiment, the laminated material layer 30 includes a plurality of laminated material unit sheets 32, 34, and 36. The laminated material unit sheets 32, 34, and 36 are sheets having a predetermined size corresponding to a size of laminated regions 2 on a substrate 1 in which the laminated material 30 is laminated.

According to the present exemplary embodiment, the laminated material unit sheets 32, 34, and 36 are formed of a sheets having rectangular shapes and laminates on the laminated regions 2 in order to manufacture a plurality of display panels on the substrate 1.

In the present exemplary embodiment, the laminated sheet 10 includes a laminated material layer 30 having three laminated material unit sheets 32, 34 and 36 arranged in parallel with each other in a linear direction as shown in FIG. 2.

The laminated material unit sheets 32, 34, and 36 are formed to be spaced by a predetermined interval $l_2$ between the adjacent laminated material unit sheets 32, 34, and 36 in a linear direction. The laminated material unit sheets 32, 34, and 36 are formed to be spaced by a predetermined interval $l_3$ between the adjacent laminated material unit sheets 32, 34, and 36 in a wide direction. The laminated regions 2 on the substrate 1 is formed to be spaced by a width corresponding to the spaces of predetermined interval $l_2$ in a linear direction and predetermined interval $l_3$ in a wide direction as shown in FIG. 4. The laminated material unit sheets 32, 34, and 36 are laminated on each laminated region 2 respectively.

Meanwhile, in the present exemplary embodiment, three laminated material unit sheets 32, 34, and 36 are formed of one laminated material layer 30 of lamination sheet 10. The number of laminated material unit sheets forming one lamination sheet, however, may be 2 or 4 or more. Numbers of the laminated material unit sheets may be formed in a longitudinal direction as well as a transverse direction.

Meanwhile, a cover film 20 is disposed on the laminated material layer 30.

The cover film 20 is a film that protects one surface of the laminated material layer 30. The cover film 20 has a wider width than the laminated material layer 30 and is formed to have a size that may cover the entire surface of the laminated material layer 30.

A cover film removing part 22 is formed on at least one side of the cover film 20 along a linear direction. The cover film removing tab 22 does not overlap the laminated material layer 30, for example, the right side portion of length side of the laminated material unit sheets of the laminated material layer 30 when being viewed from FIG. 2. Because of the cover film removing tab 22, the cover film 20 can be easily removed from the laminated material layer 30 when the cover film 20 and the laminated material layer 30 are disposed on the substrate 1 as stated below.

Therefore, referring to FIG. 3, the lamination sheet 10 according to the present exemplary embodiment is formed so that a width $W_C$ of the cover film 20 has a width wider than a width $W_L$ of the laminated material layer 30 and a width $W_B$ of the base film 40 is formed to have a width wider than the cover film 20 on one side portion of the cover film.

As shown in FIG. 3, the base film removing tab 42 is disposed to protruded from cover film 20 on at least one side along a linear direction. In other words, the lamination sheet 10 includes one region side in which the base film removing tab 42 does not overlap the cover film removing tab 22 such that it is easy to first remove the base film 40 from the lamination sheet 10.

According to the present exemplary embodiment, as can be appreciated from FIGS. 2 and 3, the cover film removing tab 22 and the base film removing tab 42 are formed at the right side of the laminated material layer 30 in a longitudinal direction. However, a part of the base film removing tab 42 is formed not to overlap with the laminated material layer 30 and the cover film removing tab 22. The base film removing tab 42 has a width wider than the cover film removing tab 22. When the cover film removing tab 22 is formed not to overlap with the laminated material layer 30, the positions of the cover film removing tab 22 and the base film removing tab 42 may be variously formed.

Meanwhile, the lamination sheet 10 according to an exemplary embodiment includes a hole region 12 in a state where the base film 40 and the cover film 20 are removed between the laminated material unit sheets 32, 34, and 36. The hole region 12 has a width of predetermined interval $l_2$.

Referring to FIG. 2, the hole region 12 has a rectangular shape with a width of $l_2$ and a length of $W_1$. The hole region 12 is formed to correspond to the space of the regions 3 between the laminated regions 2 on the substrate 1.

The hole region 12 may be formed by a punching process after applying the laminated material layer 30 on the base film 40 and positioning the cover film 20 on the laminated material layer 30. The detailed description thereof will be described below.

Figure 7:
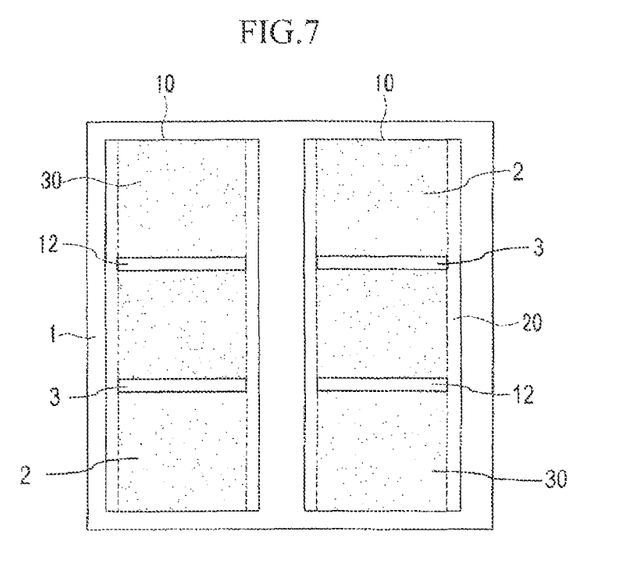
FIG. 7 is a plan view of FIG. 6B.

As shown in FIG. 7, two lamination sheets 10 according to the exemplary embodiment are arranged on the substrate 1 having the above-mentioned shape in parallel.

The detailed description showing a method for manufacturing a lamination sheet is described below. FIGS. 5A through 5D are perspective views showing a method for manufacturing the lamination sheet 10 constructed as an exemplary embodiment of present invention.

Figure 5A:
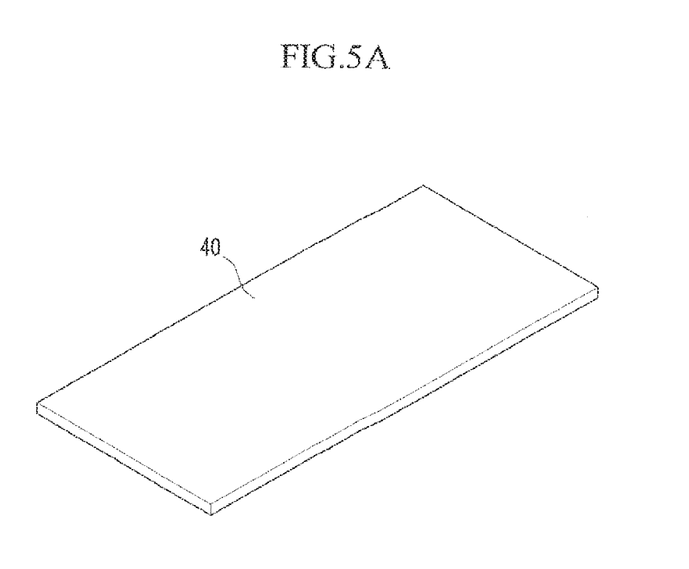
FIGS. 5A to 5D are perspective views showing a method for manufacturing a lamination sheet constructed as an exemplary embodiment of present invention.

According to the present exemplary embodiment, in order to manufacture the lamination sheet 10, the base film 40 is first provided as shown in FIG. 5A.

Figure 5B:
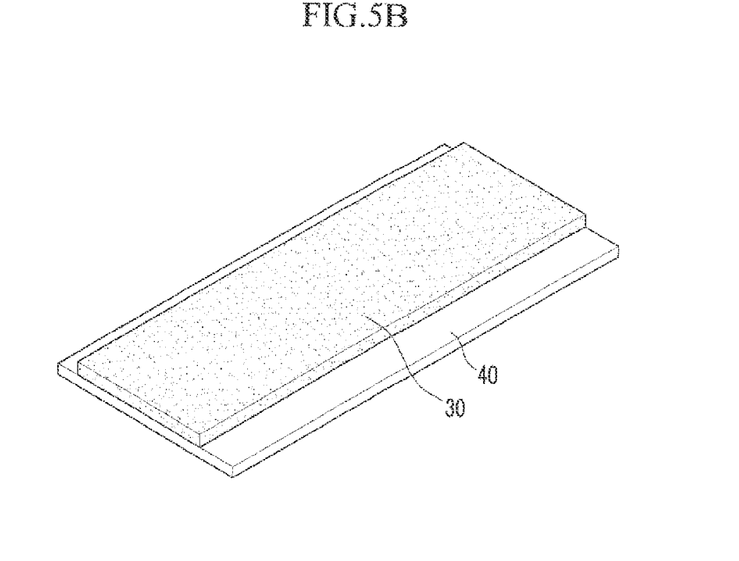

Thereafter, as shown in FIG. 5B, the laminated material layer 30 is formed on the base film 40 in a longitudinal direction. At this time, the laminated material layer 30 may be formed on the base film 40 in a thin film shape after the laminated material 30 is coated on the base film 40 and dried.

Figure 5C:
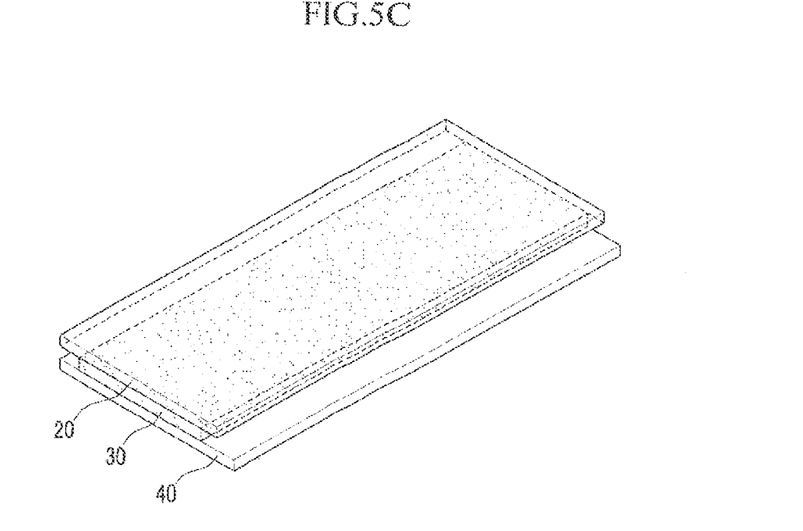
Figure 5D:
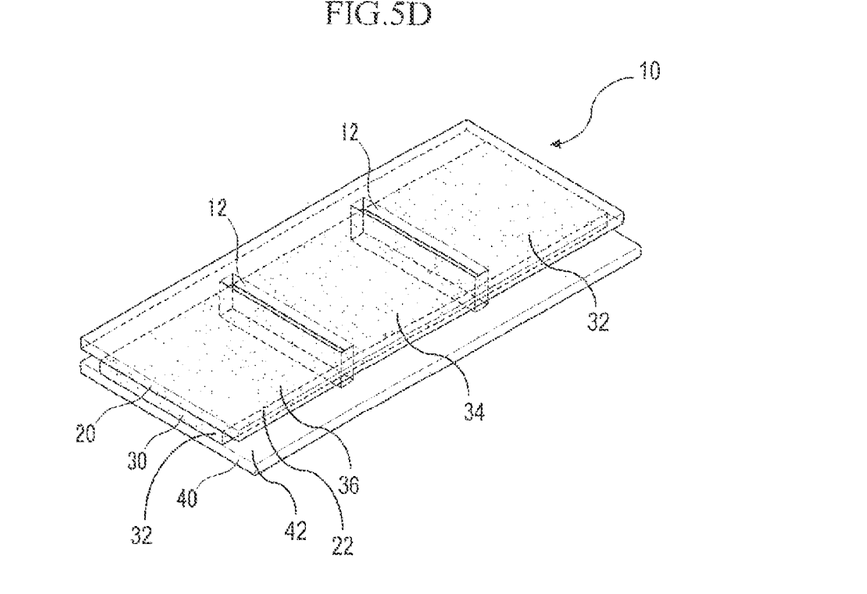

Thereafter, as shown in FIG. 5C, the cover film 20 is laminated on the laminated material layer 30. As shown in FIG. 5D, the hole region 12 is formed by removing a part of the cover film 20, a part of the laminated material layer 30, and a part of the base film 40 so that the laminated material layer 30 forms a plurality of laminated material unit sheets 32, 34, and 36. At this time, the punching may be used as a method for removing a part of the cover film 20, a part of the laminated material layer 30, and a part of the base film 40.

With the method for manufacturing the lamination sheet according to the present exemplary embodiment, when the laminated material layer 30 is formed on the base film 40, the laminated material layers 30 is not applied to have the same size of the laminated material unit sheets 32, 34, and 36 in order to meet the size of the laminated regions 2 to the substrate 1. The laminated material layer 30 with a predetermined size is extended on the base film 40 in a length direction, and then unnecessarily laminated parts are removed. For example, the parts corresponding to a region 3 between the laminated regions 2 on the substrate 1 are removed. Thereby the plurality of laminated material unit sheets 32, 34, and 36 having the same size of the laminated regions 2 is formed. As a result, the process for forming the plurality of laminated material unit sheets 32, 34, and 36 on the base film 40 is simplified.

Figure 6A:
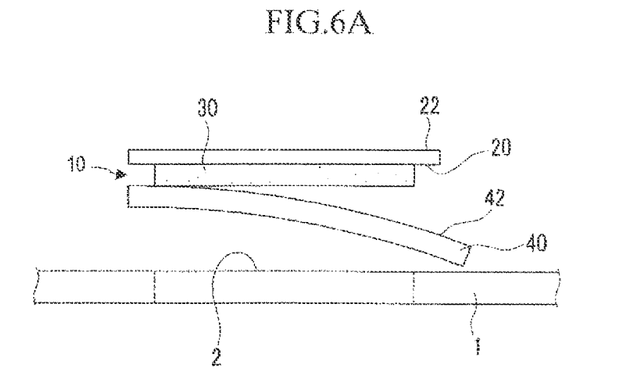
FIGS. 6A to 6C are cross-sectional views showing a process for attaching a lamination sheet to a substrate constructed as an exemplary embodiment.
Figure 6B:
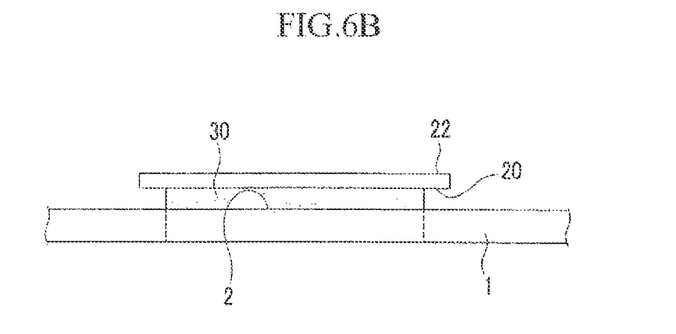
Figure 6C:
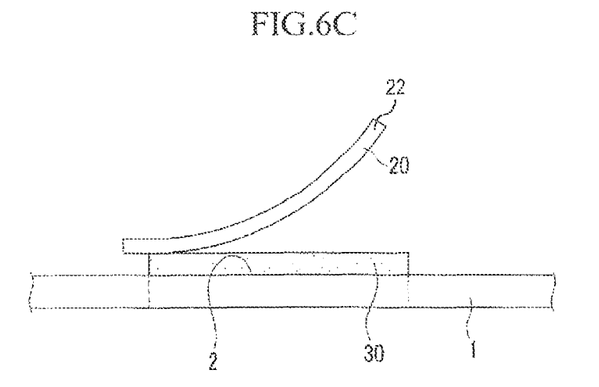

FIGS. 6A to 6C are cross-sectional views showing a process for attaching the lamination sheet 10 to a substrate constructed as an exemplary embodiment.

Referring to FIG. 6A, in order to laminate the laminated material layer 30 in the laminated region 2 on the substrate 1, the base film 40 is first removed. The base film 40 is removed by using the base film removing tab 42 by pulling the base film 40 to the lower side of the laminated material layer 30.

Thereafter, as shown in FIG. 6B, the laminated material layer 30 is positioned in the laminated region 2 on the substrate 1.

In the present exemplary embodiment, two lamination sheets 10 having two laminated material layers 30 are disposed on one substrate 1. Each laminated material layer 30 includes three laminated material unit sheets 32, 34, and 36. Therefore, a pair of laminated material unit sheets 32, 34, and 36 are formed to be disposed on six laminated regions 2 in parallel on one substrate 1.

At this time, when the lamination sheet 10 is disposed on the substrate 1, the hole regions 12 of the lamination sheet 10 is formed to overlap in the regions 3 between the laminated regions 2 on the substrate 1 as can be appreciated from FIG. 7.

Thereafter, as shown in FIG. 6C, the cover film 20 is removed from the laminated material layer 30.

At this time, since the cover film removing tab 22 does not overlap with the laminated material layer 30, the cover film removing tab 22 may be removed by griping the cover film removing tab 22 and then pulling the cover film removing tab 22 to the upper side of the laminated material layer 30. This process makes the cover film 20 to be easily removed.

Figure 8:
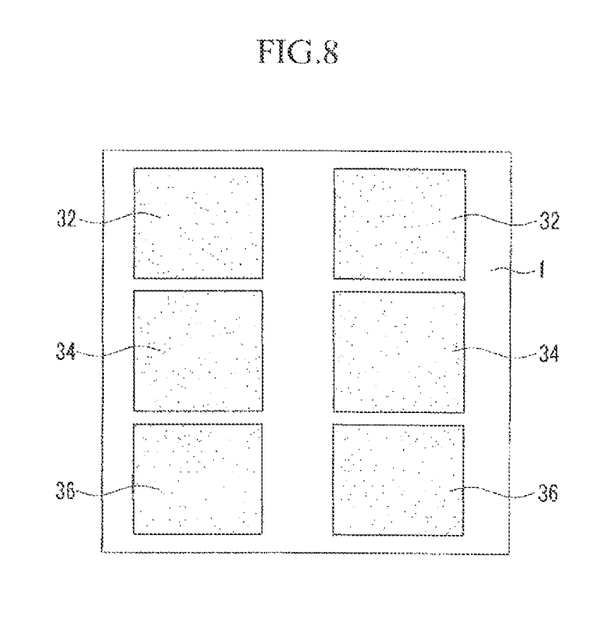
FIG. 8 is a plan view showing a state where laminated material unit sheets of a lamination sheet constructed as an exemplary embodiment are attached to a substrate.

After the cover film 20 is removed from two lamination sheets 10 which are disposed on the substrate 1, the substrate 1 is in the state where a pair of the laminated material unit sheets 32, 34, and 36 are positioned on the laminated regions 2 on the substrate 1 as shown in FIG. 8.

As can be appreciated from FIGS. 6A to 6C and FIG. 8, when attaching the laminated material unit sheets 32, 34, and 36 on the substrate 1 by using the lamination sheet 10 according to the present exemplary embodiment, if the base film 40 is removed from the laminated material layer 30, and the laminated material unit sheets 32, 34, and 36 in the lamination sheet 10 are already formed at the size of the laminated regions 2, the laminated material unit sheets 32, 34, and 36 positioned in the lamination sheet 10 may be easily laminated in the laminated regions 2 of the substrate 1 and then the cover film 20 maybe easily removed. Therefore, the laminated material layer 30 positioned on the laminated sheet 10 is laminated on the substrate 1 easily, thereby this simple method makes the laminated material unit sheets 32, 34, and 36 possible to form on the pluralities of laminated regions 2 on one substrate 1 by a simplified process.

In addition, the lamination sheet 10 according to the present exemplary embodiment may be formed by using the base film removing tab 42 and the cover film removing tab 22 in order to easily remove the base film 40 and the cover film 20, thereby laminating the lamination sheet 10 on the substrate 1 by a simplified process is possible.

At this time, although the present exemplary embodiment describes laminating the laminated material layer on the substrate, the shapes and size of the substrate may be variously changed. The material of the laminated material layer may be variously changed. The size and shapes and the material of the lamination sheet (such as base film, cover film), and the size and the shapes of the hole regions 12 and the laminated material unit sheets may also be variously changed.

While the foregoing paragraphs describe the details in connection with what is presently considered to be practical exemplary embodiments, it is to be understood that the principle of the present invention is not limited to the described embodiments. On the contrary, described embodiments are intended to cover various modifications and equivalent arrangements included within the spirit and scope of the appended claims.

What is claimed is:

1. A lamination sheet for use to attach on display panels, comprising:
    a base film;
    a laminated material layer disposed upon the base film;
    a cover film disposed upon the laminated material layer, with the laminated material layer interposed between the base film and the cover film, and
    one edge of the base film comprising a base film removing tab extending beyond one edge of the laminated material layer and the base film removing tab not overlapping the laminated material layer;
    one edge of the cover film comprising a cover film removing tab extending beyond one edge of the laminated material layer and the cover film removing tab not overlapping the laminated material layer; and
    at least a part of the base film removing tab is formed not to overlap the cover film removing tab; wherein
    the laminated material layer comprises a plurality of laminated material unit sheets having a predetermined size and a rectangular shape and the laminated material unit sheets are disposed on the base film to be spaced from each other by hole regions; and
    the hole regions from where the base film, the laminated material layer and the cover film are removed are formed between the adjacent laminated material unit sheets to form the plurality of laminated material unit sheets, and the length of the hole region and the width of the adjacent laminated material unit sheets are same.

2. The lamination sheet of claim 1, wherein the plurality of the laminated material unit sheets is formed in three.

3. The lamination sheet of claim 1, wherein the plurality of the laminated material unit sheets are arranged in parallel with each other in a longitudinal direction.

4. The lamination sheet of claim 1, wherein the base film and the cover film are formed to be more extended in both sides than the laminated material layer.

5. The lamination sheet of claim 1, wherein at least one side portion of both side portions of the base film is more extended in a traverse direction than the cover film.

6. The lamination sheet of claim 1, wherein the width of the laminated material unit sheet corresponds to the width of a substrate to which the laminated material unit sheet is attached.

7. The lamination sheet of claim 1, wherein all of the widths of pluralities of the laminated material unit sheets are the same.

8. The lamination sheet of claim 1, wherein all of the widths between pluralities of laminated material unit sheets are the same.

* * * * *